US012505225B2

(12) United States Patent
McCarthy et al.

(10) Patent No.: US 12,505,225 B2
(45) Date of Patent: Dec. 23, 2025

(54) CYBERSECURITY THREAT MANAGEMENT USING IMPACT SCORING

(71) Applicant: Arctic Wolf Networks, Inc., Eden Prairie, MN (US)

(72) Inventors: Joshua McCarthy, Morgan Hill, CA (US); Romans Bermans, Cadiz (ES); David B McKinley, Dartmouth, MA (US)

(73) Assignee: Arctic Wolf Networks, Inc., Eden Prairie, MN (US)

( * ) Notice: Subject to any disclaimer, the term of this patent is extended or adjusted under 35 U.S.C. 154(b) by 535 days.

(21) Appl. No.: 17/890,304

(22) Filed: Aug. 18, 2022

(65) Prior Publication Data

US 2022/0405401 A1 Dec. 22, 2022

Related U.S. Application Data

(63) Continuation-in-part of application No. 17/825,024, filed on May 26, 2022.
(Continued)

(51) Int. Cl.
*G06F 21/57* (2013.01)
*G06F 21/56* (2013.01)

(52) U.S. Cl.
CPC .......... *G06F 21/577* (2013.01); *G06F 21/566* (2013.01); *G06F 2221/033* (2013.01)

(58) Field of Classification Search
CPC .................. G06F 21/577; G06F 21/566; G06F 2221/033; G06F 21/554
See application file for complete search history.

(56) References Cited

U.S. PATENT DOCUMENTS

| 10,534,971 B2 | 1/2020 | Huber, Jr. et al. |
| 10,621,172 B2 | 4/2020 | Azaria et al. |

(Continued)

FOREIGN PATENT DOCUMENTS

| GB | 2594248 A | 10/2021 |
| KR | 10-2020-0083874 | 7/2020 |

OTHER PUBLICATIONS

Anonymous, "Cybersecurity in the Age of the Cloud", Feb. 1, 2020 (Feb. 1, 2020) XP093131485, Retrieved from the Internet: URL:https://www.sans.org/m edi a/cloud-security /eBook_ cloud-security. pdf?msc=cloudsecu rityl p, on Feb. 14, 2024.
(Continued)

*Primary Examiner* — Thomas A Gyorfi
(74) *Attorney, Agent, or Firm* — Barnes & Thornburg LLP

(57) ABSTRACT

Disclosed techniques include cybersecurity threat management using impact scoring. A plurality of cybersecurity threat protection applications is accessed. A first cybersecurity threat notification is received from one of the plurality of cybersecurity threat protection applications. An impact score is dynamically assigned to the first cybersecurity threat notification, wherein the assigning an impact score is based on information about a device for which the first cybersecurity threat notification was received. The impact score is weighted based on an evaluation of a user of the device for which the first cybersecurity threat notification was received. The weighting is further based on evaluation of device owners and evaluation of an asset. The information about a device and information about one or more users of the device comprise impact score metadata. The first cybersecurity threat notification is responded to, based on the impact score. The dynamically assigning includes the impact score metadata.

24 Claims, 7 Drawing Sheets

Related U.S. Application Data

(60) Provisional application No. 63/350,891, filed on Jun. 10, 2022, provisional application No. 63/327,853, filed on Apr. 6, 2022, provisional application No. 63/297,273, filed on Jan. 7, 2022, provisional application No. 63/274,302, filed on Nov. 1, 2021, provisional application No. 63/234,729, filed on Aug. 19, 2021, provisional application No. 63/193,615, filed on May 27, 2021.

(56) References Cited

U.S. PATENT DOCUMENTS

| | | | |
|---|---|---|---|
| 10,776,316 B2 | 9/2020 | Baggeroer et al. | |
| 10,901,863 B2 | 1/2021 | Lukkoor et al. | |
| 10,922,452 B2 | 2/2021 | Liu et al. | |
| 10,924,527 B2 | 2/2021 | Miller | |
| 11,411,980 B2* | 8/2022 | Triantafillos | H04L 67/535 |
| 11,444,974 B1* | 9/2022 | Shakhzadyan | H04L 63/1466 |
| 11,611,590 B1* | 3/2023 | Amar | G06Q 10/105 |
| 2006/0021045 A1 | 1/2006 | Cook | |
| 2010/0154027 A1* | 6/2010 | Sobel | G06F 21/552 726/1 |
| 2014/0137257 A1* | 5/2014 | Martinez | H04L 63/1433 726/25 |
| 2015/0026810 A1 | 1/2015 | Friedrichs et al. | |
| 2018/0041533 A1 | 2/2018 | Chesla | |
| 2018/0121316 A1 | 5/2018 | Ismael et al. | |
| 2018/0357422 A1 | 12/2018 | Telang et al. | |
| 2019/0297118 A1* | 9/2019 | Haugsnes | H04L 63/1441 |
| 2020/0053109 A1* | 2/2020 | Lancioni | H04L 63/1425 |
| 2020/0143060 A1 | 5/2020 | Tineo | |
| 2020/0233955 A1* | 7/2020 | Ramzan | G06F 21/554 |
| 2020/0244412 A1 | 7/2020 | Kalhan | |
| 2020/0244696 A1 | 7/2020 | Thomas et al. | |
| 2020/0252421 A1 | 8/2020 | Pendergast et al. | |
| 2020/0280443 A1 | 9/2020 | Simons | |
| 2020/0342552 A1 | 10/2020 | Sulit et al. | |
| 2020/0380006 A1 | 12/2020 | Rockwell et al. | |
| 2020/0412758 A1* | 12/2020 | Trivellato | G06F 21/577 |
| 2021/0021644 A1* | 1/2021 | Crabtree | G06F 16/951 |
| 2021/0042589 A1 | 2/2021 | Tokarev Sela et al. | |
| 2021/0070333 A1 | 3/2021 | Chen | |
| 2021/0117251 A1* | 4/2021 | Cristofi | G06F 21/554 |
| 2021/0136089 A1* | 5/2021 | Costea | H04L 41/22 |
| 2022/0053006 A1 | 2/2022 | O'Hara | |
| 2022/0094705 A1* | 3/2022 | Tineo | H04L 63/1441 |

OTHER PUBLICATIONS

Boutaba, Raouf, et al. "A comprehensive survey on machine learning for networking: evolution, applications and research opportunities." Journal of Internet Services and Applications 9.1 (2018): 1-99.

European Extended Search Report dated Feb. 3, 2025, 10 pages.

International Search Report dated Aug. 31, 2022 for PCT 2022/031003.

Sangani, Nilaykumar Kiran, and Haroot Zarger. "Machine learning in application security." Advances in Security in Computing and Communications. IntechOpen, 2017.

* cited by examiner

CYBERSECURITY THREAT MANAGEMENT USING IMPACT SCORING

RELATED APPLICATIONS

This application claims the benefit of U.S. provisional patent applications "Cybersecurity Threat Management Using Impact Scoring" Ser. No. 63/234,729, filed Aug. 19, 2021, "Integrated Cybersecurity Threat Management" Ser. No. 63/274,302, filed Nov. 1, 2021, "Cybersecurity State Change Buffer Service" Ser. No. 63/297,273, filed Jan. 7, 2022, "Cybersecurity Workflow Management Using Autodetection" Ser. No. 63/327,853, filed Apr. 6, 2022, and "Cybersecurity Operations Center Load Balancing" Ser. No. 63/350,891, filed Jun. 10, 2022.

This application is also a continuation-in-part of U.S. patent application "Cybersecurity Threat Management Using Element Mapping" Ser. No. 17/825,024, filed May 26, 2022, which claims the benefit of U.S. provisional patent applications "Cybersecurity Threat Management Using Element Mapping" Ser. No. 63/193,615, filed May 27, 2021, "Cybersecurity Threat Management Using Impact Scoring" Ser. No. 63/234,729, filed Aug. 19, 2021, "Integrated Cybersecurity Threat Management" Ser. No. 63/274,302, filed Nov. 1, 2021, "Cybersecurity State Change Buffer Service" Ser. No. 63/297,273, filed Jan. 7, 2022, and "Cybersecurity Workflow Management Using Autodetection" Ser. No. 63/327,853, filed Apr. 6, 2022.

Each of the foregoing applications is hereby incorporated by reference in its entirety.

FIELD OF ART

This application relates generally to cybersecurity management and more particularly to cybersecurity threat management using impact scoring.

BACKGROUND

Since the end of World War II, first-world societies have become increasingly dependent on digital computer systems. At first, these systems were mainly used by governments and large corporations for defense, communications, and mass record storage. As computer science grew and became more sophisticated, more industries, corporations, and government entities began to take advantage of the rapid calculation, enormous storage, and problem-solving capabilities made available by these systems. Tasking computer systems to monitor and control other systems and processes in industries such as manufacturing, energy production, communications, and transportation added to their usefulness. As a result, the quantity and value of the information and programs stored on computer systems multiplied, as did the reliance of governments and private companies on their capabilities. Then, starting in the late 1970s, personal computers entered the marketplace with offerings from several companies, both new and established. As governments and corporations did, private individuals rapidly increased their use of these systems. In addition, cell phones and tablets increased the rate at which users added more valuable private information and activities to computer systems and networks. As the value of the data stored on computer systems grew, the motivation of bad actors to compromise these systems grew as well. When a noted criminal from an earlier era was asked why he robbed banks, his famous reply was, "That's where the money is." In modern times, the digital equivalent of banks are computer systems and networks, and the motivation to compromise, damage, and steal from them is the same. They are where the money is.

Thus, attacks have been made on computer systems since the earliest days of the digital computing era. The early generations of computers were only accessible to those physically present at input and output devices such as card readers and punches, perforated paper tape units, and keyboard-printers. Access was limited to authorized users only. To compromise the computer systems, a malefactor had to be onsite to load malicious code or to remove data in the form of cards, tapes, or printouts. Later, data could be maliciously obtained by removing magnetic storage media such as cards and tapes. However, requiring onsite access to computers was inconvenient for authorized users. The users had to travel to computer installations or "machine rooms", which were cold, drafty, noisy, and potentially lethal due to fire suppression technologies. To improve user access, "remote" terminals were provided. Users could access computers from terminals distributed around an office, school, or hospital, among other enterprises. Computers also could access each other through hardwired and telephonic connections. Increased access for legitimate users also increased access for bad actors. Physical connections could be tapped, and code could be introduced or data collected. Modern networking technologies enable computer access from practically any location on earth. Such access enables authorized users to log into a computer network from the office, coffee shop, airplane, or vacation spot. Unfortunately, criminals too can attempt access from around the globe without regard to ownership, jurisdiction, or borders.

SUMMARY

Successful management of cybersecurity threats is critical to the continuous and reliable computing operations of enterprises including businesses, universities, hospitals, government agencies, financial institutions, retailers, and so on. Enterprises are acutely aware of these myriad threats, and actively identify and implement state-of-the art best practices to secure their information technology (IT) infrastructure against the threats. While preventative measures such as application and operating system updates are critical to IT operations, these measures alone do not provide universal protection. The cybersecurity threats are constantly evolving and becoming increasingly more sophisticated, so constant vigilance and action is required. As soon as a solution is found that identifies, reacts to, and eradicates a threat such as a virus; thwarts a Trojan horse program; or detects and deletes a phishing attack; the malefactors behind the threats themselves adapt the techniques by using new attack vectors, social engineering ploys, and other deceptions.

Disclosed techniques for cybersecurity management enable cybersecurity threat management using impact scoring. A plurality of cybersecurity threat protection applications is accessed. The cybersecurity threat protection applications can include one or more data management schemas. The plurality of threat protection applications can include managing applications for one or more of antivirus analysis, phishing attacks, security information and event management (SIEM) triage, threat hunting, insider threat protection, threat intelligence, identity verification reinforcement, endpoint protection, forensic investigation, cryptojacking, vulnerability management, cloud security orchestration, and end-to-end incident lifecycle case management. A first cybersecurity threat notification is received from one of the plurality of cybersecurity threat protection applications. The notification can include a flag, a signal, and alert, an SMS message, an email message, and so on. An impact score is dynamically assigned to the first cybersecurity threat notification, wherein the assigning an impact score is based on information about a device for which the first cybersecurity threat notification was received. The impact score can include a value, a percentage, a threshold, etc. Additional cybersecurity threat notifications can be received, where the additional notifications can include information regarding the device for which the first cybersecurity threat notification was received. The first cybersecurity threat notification is responded to, based on the impact score. The response can include blocking a device, removing cybersecurity threat data and code from a device, putting a workflow into action, and the like.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
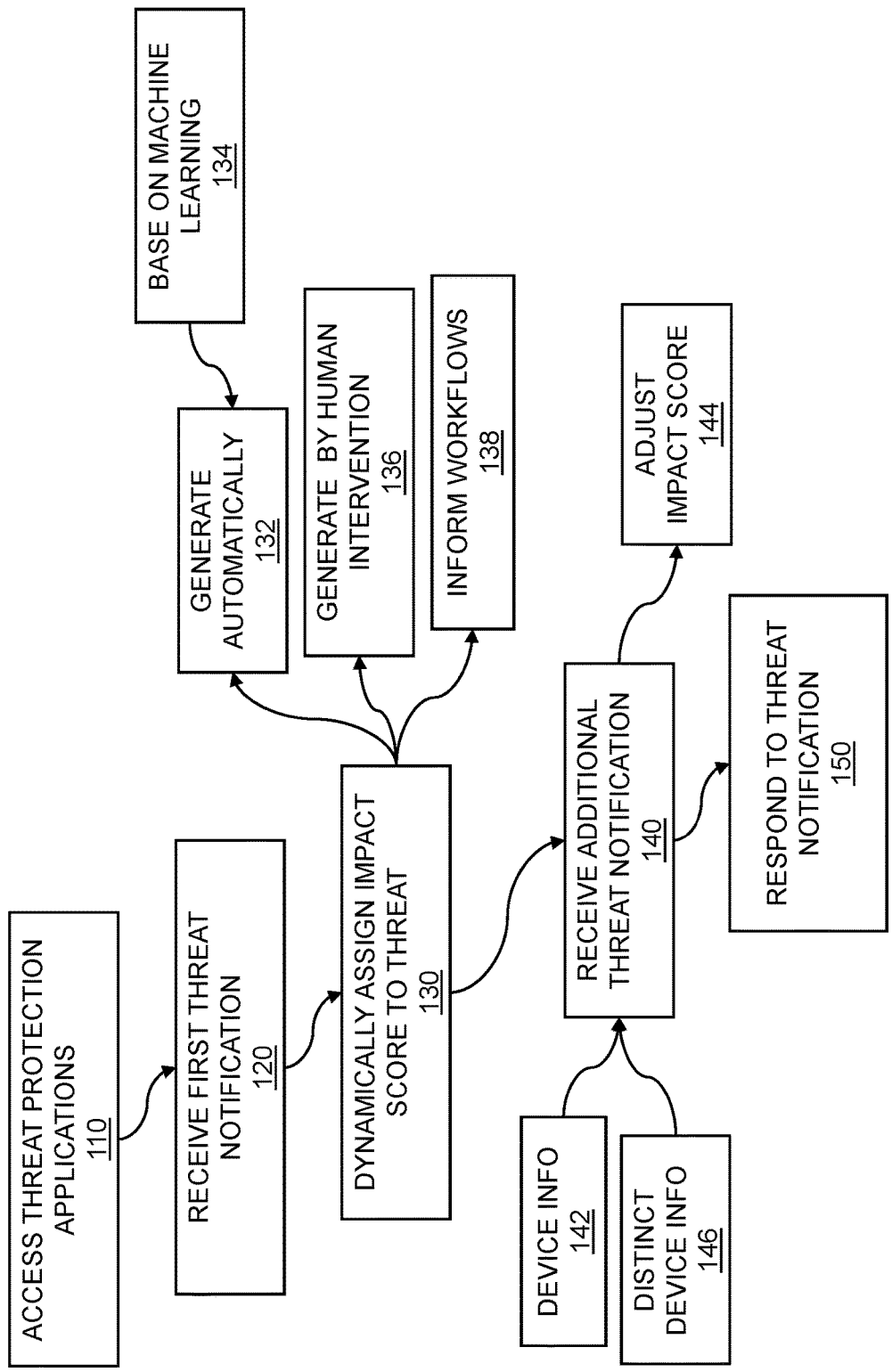
FIG. 1 is a flow diagram for cybersecurity threat management impact scoring.

The information technology infrastructures of enterprises large and small are under constant attack by foreign and domestic actors, including criminals, government sponsored actors, terrorists, and other malefactors. Enterprises such as businesses, retailers, universities, hospitals, research laboratories, and government agencies are at constant risk. Cyberattacks have been recorded to occur as often as every few seconds. Enterprises including retail, high technology, and government, known as the "big three", are by far the most often attacked. Yet even small businesses and individuals are also targeted by cybercriminals. Other high value targets include media companies who are perceived to have insulted national leaders, and national infrastructures such as energy grids and fuel pipelines. The "big three" are attacked because of the value of their data and the capability of large financial payouts. The smaller enterprises and the individuals are targets for quick payouts, even if relatively small, and for identity theft. Infrastructure is attacked because of the potential to cause both huge interruptions of energy delivery and market chaos. Small enterprises may be willing to pay any amount they can to recover their business data from malefactors who maliciously encrypted the data. An individual may freely and unwittingly provide usernames and passwords to bank or brokerage accounts, personal information such as telephone numbers, email addresses, physical addresses, age, gender, birthdate, national identification number, and so on, to the cybercriminals, not knowing they are doing so. Some or all of the personal information can be used to open bank accounts, obtain credit cards or loans, and perform other actions which can be ruinous to the individual's financial wellbeing, credit score, etc. The individual may also drain their personal savings or run up substantial personal debt to transfer funds to what turns out to be an offshore financial institution, thinking they are aiding a friend or relative in distress.

Enterprises dedicate substantial resources to engage in cybersecurity activities designed to counter cybersecurity threats, and to protect computing systems, data, and other critical information technology (IT) infrastructure. Each of the cybersecurity activities, including cybersecurity threat management, is crucial to securing IT infrastructure, and to ensuring safe and reliable computing operations of the enterprises. Depending on the particular enterprise or the type of enterprise, further critical threat protections can be put in place. These latter threat protections can include advanced techniques such as biometric verification, two-factor authentication, coded challenges and responses, encrypted communications channels, and so on. The enterprises can be public or private ones, large or small, and can include businesses, hospitals, government agencies, research facilities, universities, and so on. The enterprises are acutely aware that cybersecurity best practices are crucial to the continued operation of, and perhaps the survival of, the enterprises. Cybersecurity is not only a highly complex activity, but also an expensive and ever changing one. The cybersecurity measures taken today by the enterprises may thwart known attack techniques, but the techniques used by cybercriminals are constantly changing, specifically to thwart the cybersecurity measures. Nearly as soon as a detection tool is developed for identifying, reacting to, and eradicating a cybersecurity threat such as a virus, a Trojan horse program, or a phishing attack, the cybercriminals adapt their threat techniques in an ever-escalating high stakes cyber-game of cat and mouse. The threat adaptation includes targeting popular electronic devices, using new attack vectors, improving social engineering ploys, and other deceptions. Purported links to naughty and compromising photographs of famous people, earnest promises of shared wealth from displaced nobility, and desperate pleas for help from relatives and friends who are in serious trouble while visiting distant locations are specifically designed by their perpetrators to motivate their victims to react quickly, viscerally, and unthinkingly. Other ploys include completely copying the landing page of a website with which the victim is familiar. Unless the victim looks at the web address, she or he would be unaware of the deception until their personal information is stolen or their bank accounts are emptied and transferred to an offshore bank.

In disclosed techniques, cybersecurity threat management is accomplished using impact scoring. Cybersecurity threat protection applications can provide notifications of detected cybersecurity threats, but additional information is critical to quickly determining the extent of the threat, a risk level associated with the threat, and so on. By dynamically assigning an impact score to a cybersecurity threat, and by weighting the impact score based on additional information such as evaluation of a device, a user, an owner, and an asset, a reaction plan, a workflow, or some other response can be determined. A plurality of cybersecurity threat protection applications is accessed. A first cybersecurity threat notification is received from one of the plurality of cybersecurity threat protection applications. An impact score is dynamically assigned to the first cybersecurity threat notification, wherein the assigning an impact score is based on information about a device for which the first cybersecurity threat notification was received. The first cybersecurity threat notification is responded to, based on the impact score.

FIG. 1 is a flow diagram for cybersecurity threat management impact scoring. Cybersecurity threat management can be accomplished based on the use of an impact score. The impact score can be dynamically assigned to a cybersecurity threat based on a notification of the threat. The assigning the impact score can be based on additional information such as information about the device for which the threat notification was received. The impact score can further be weighted based on a user of the device, an owner of the device, an asset accessed by the device, and so on. A response to the cybersecurity threat notification can be launched based on the impact score. The flow 100 shows a computer-implemented method for cybersecurity management. The flow 100 includes accessing a plurality of cybersecurity threat protection applications 110. The threat protection applications can defend computer systems, data systems, data networks, and so on against various types of malicious cyberattacks. The malicious cyberattacks can include malware attacks, hacking attacks, distributed denial of service attacks (DDoS), person-in-the-middle attacks, and so on. The applications can include antivirus, anti-phishing, and anti-cryptojacking applications, tools for threat hunting and threat intelligence, identity verification, endpoint protection, forensic investigation, incident management, and so on. The plurality of cybersecurity threat protection applications can include data management schemas. A management schema can be based on a security domain which can contain one or more database objects. Access to the one or more database objects can be controlled by granting access privileges to each user or role, where a role can include a user, a manager, an administrator, and so on.

The flow 100 includes receiving a first cybersecurity threat notification 120 from one of the plurality of cybersecurity threat protection applications. Other cybersecurity threat protection applications may also send notifications (discussed below). The threat notification can be launched in reference to virus detection, Trojan horse detection, insider threat detection, cryptojacking detection, intrusion detection, and so on. The notification that is received can include one or more of signals, flags, SMS or email messages, indications, and other outputs generated by the notifying application. The notifications can be received as part of a cybersecurity management system. The notification can include a simulated notification, a test notification, and so on. The simulated or test notification can be used to determine the efficacy of detecting a threat and generating a notification based on the threat. The simulated or test notification can be used to test various threat scenarios. The testing can be based on simulation, emulation, hypothesis testing, and the like. In embodiments, the information about a device for which the first cybersecurity threat notification was received can include a management level designation for the device or a user of the device. A management level designation for a device can include an unmanaged personal electronic device, an unsupported device, a managed corporate device, and so on. The management level designation for a user can include an employee, a temporary employee, a contractor, an affiliate, and the like. In other embodiments, the information about a device for which the first cybersecurity threat notification was received can include a usage location designation. The usage location can include onsite or offsite a building, floor, and room; a physical street address; a regional or national location; etc. In further embodiments, the information about a device for which the first cybersecurity threat notification was received can include a security clearance designation for the device or a user of the device. A security clearance designation for a device or a user of the device can include a military or government clearance level, a corporate clearance level, access controlled by an access control list (ACL), and so on. In other embodiments, the information about a device for which the first cybersecurity threat notification was received can include a security metric designation for the device or a user of the device. A security metric can include one or more of a mean-time-to-detect and mean-time-to-respond to a threat notification for the device or the user. A security metric can include known vulnerabilities of the device or known vulnerabilities based on what the user has access to. A security metric can include known security settings associated with the device.

The flow 100 includes dynamically assigning an impact score 130 to the first cybersecurity threat notification, wherein the assigning an impact score is based on information about a device for which the first cybersecurity threat notification was received. The impact score can be calculated based on a scoring function, can be estimated, can be assigned a value, can be provided with a qualitative determination, and so on. The impact score can include a single value, a range of values, a percentage, and so on. The impact score can be compared to a target or desired value, a threshold, etc. The information about the device can include a model name and a hardware configuration such as processor speed and memory and storage capacities. The device information can include an operating system such as Windows™, macOS™, or Chrome OS™ version; Android™, iOS™, or iPadOS™ version; etc. In embodiments, the information about a device and information about one or more users of the device can include impact score metadata. The metadata can include device information, user status, user rank, user location, user security clearance, etc. The device information can further include the device user, device owner, and the like. Discussed below, the impact score can be weighted, where the weighting the impact score can be based on evaluation of the device, a user of the device, an owner of the device, and an asset. In other embodiments, the dynamically assigning includes the impact score metadata.

In further embodiments, the impact score is generated automatically 132. The automatic generation can be based on a function, an algorithm, a heuristic, and the like. The automatic generation can be based on lookup table. In the flow 100, the automatic generation is based on machine learning 134. A network such as a neural network can be trained to assign, determine, or infer an impact score. Training of the machine learning neural network can be accomplished using training data for which expected results are known. Once trained, the machine learning neural network can determine impact scores for new data (e.g., non-training data). In the flow 100, the impact score is generated by human intervention 136. The human who generated the impact score can include a security expert, a cybersecurity threat forensic expert, an IT expert, and so on. In embodiments, the human intervention can be performed with computer-assisted information. The computer-assisted information can include forensic information, simulation results, "white hat" testing results, and the like. In the flow 100, the impact score informs one or more workflows 138 controlling cybersecurity threat management. The one or more workflows can include techniques for determining a threat, identifying the treat, reacting to the threat, and so on.

The flow 100 includes receiving an additional cybersecurity threat notification 140. The additional cybersecurity threat notification can include an additional notification from the cybersecurity threat protection application that provided the first threat notification. In embodiments, the additional cybersecurity threat notification can include impact score metadata. Discussed in detail below, the impact score metadata can include further information associated with one or more of device information, user status, user rank, user location, and user security clearance. The additional cybersecurity threat notification can include a notification from a different cybersecurity threat protection application. In the flow 100, the additional cybersecurity threat notification includes information 142 regarding the device for which the first cybersecurity threat notification was received. The threat notification can include additional instances of the first threat, additional information associated with the first threat, information from a different threat detection application, and the like. The flow 100 further includes adjusting the impact score 144 based on the additional cybersecurity threat notification. The impact score can be recalculated, weighted, normalized, updated, etc., based on the additional threat notification. In the flow 100, the additional cybersecurity threat notification includes information regarding a device that is distinct 146 from the device for which the first cybersecurity threat notification was received. The additional threat notification from the distinct device can indicate that the distinct device is also threatened, that the distinct device also confirms the threat associated with the first device, etc. Embodiments further include adjusting the impact score 144 based on the additional cybersecurity threat notification The flow 100 includes responding 150 to the first cybersecurity threat notification, based on the impact score. Responding to the first cybersecurity threat notification can include executing threat countermeasures. The countermeasures can include locking down, blocking, or disabling one or more devices; blocking network access by updating a firewall to block one or more ports and one or more communications protocols; initiating virus, Trojan, or cryptojacking countermeasures; activating security or law enforcement; and the like. Responding to the first cybersecurity threat notification can include activating one or more data enrichment protocols for a threat. A data enrichment protocol can be based on data stimuli received from at least one of the plurality of cybersecurity threat protection applications. Viruses, Trojan horse programs, phishing attacks, and other forms of cybersecurity threats are constantly evolving. As a result, response techniques must also progress and adapt. Threat response data can be updated or enriched by consulting in-house experts, learning from previous response successes and failures, and so on. The enrichment can enable modification or adaptation of the applications. One or more data enrichment protocols can enable modification of a typical response for the threat.

Various embodiments of the flow 100 can be included in a computer program product embodied in a non-transitory computer readable medium that includes code executable by one or more processors.

Figure 2:
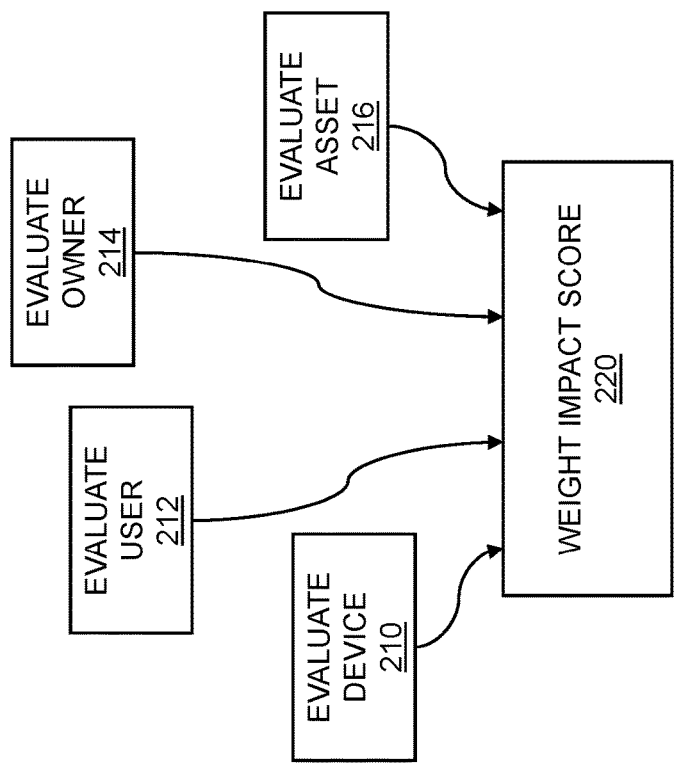
FIG. 2 is a flow diagram for impact score weighting.

FIG. 2 is a flow diagram for impact score weighting. An impact score can be dynamically determined for a cybersecurity threat identified by a cybersecurity threat protection application. The impact score can be based on a value; a range of values; a score; a percentage; a relative scale such as low, medium, high, or critical; and so on. The impact score can be used to determine a response to the cybersecurity threat. In order to improve the usefulness of the dynamically assigning of the impact score, one or more weights can be applied to the impact score. The weights can be based on receiving additional information about the cybersecurity threat. The weighting can be used to "fine tune" the impact score, to better determine a course of action and response to the threat, and the like. Impact score weighting supports cybersecurity threat management using impact scoring. A plurality of cybersecurity threat protection applications is accessed. A first cybersecurity threat notification is received from one of the plurality of cybersecurity threat protection applications. An impact score is dynamically assigned to the first cybersecurity threat notification, wherein the assigning an impact score is based on information about a device for which the first cybersecurity threat notification was received. The first cybersecurity threat notification is responded to, based on the impact score.

The flow 200 includes evaluation of the device 210 for which the first cybersecurity threat notification was received. In embodiments, the device can include a group of devices. The group of devices can be associated with a working group, a research team or laboratory, a university class, and so on. The evaluating of the device can include determining a type of device. The device and group of devices can include a desktop computer; a server such as a parallel processor, blade server, or mesh server; and so on. In embodiments, the group of devices can include multiple end-user devices. In other embodiments, the group of devices can include a portable, network-connected device. The portable network-connected device can include a handheld device such as a smartphone, PDA, or tablet; a computer such as a desktop computer; etc. In further embodiments, the group of devices can include a network infrastructure. The network infrastructure can include routers, switches, and so on. Other devices can include one or more of a data storage device such as network attached storage (NAS) or a storage area network (SAN), etc. The evaluation of the device can include determining a type, make, and model of a device; a hardware configuration associated with the device; a software configuration including an operating system and installed apps; and the like.

The flow 200 includes evaluation of a user 212 of the device for which the first cybersecurity threat notification was received. The user can include an authorized user. The authorized user can include an employee, a contractor, a temporary employee, and so on. The user can include a person associated with a university, hospital, research facility, and the like. Evaluation of the user can include a rank. The rank can include a job rank, such as administrative staff, business staff, engineering/technical staff, marketing staff, etc. The rank can include a rank within an organizational hierarchy. Evaluation of the user can include an access level. An access level can be associated with a job title or position within an organization, an access control list (ACL), etc.

The flow 200 includes evaluation of an owner 214 of the device for which the first cybersecurity threat notification was received. The owner can include an individual who is using a personal electronic device such as a personal smartphone, PDA, tablet, or laptop computer. The owner can include an individual who is using an organization-issued device. Information about the owner of the device can be based on user authentication, a registration list, etc. The flow 200 includes evaluation of an asset 216 for which the first cybersecurity threat notification was received. An asset can include one or more information technology assets such as processing assets, data storage assets, network assets, and the like. The asset can include printers, desktop backup storage media such as removable or portable disk drives, USB devices, etc. The asset can include data and databases such as secured, confidential, and encrypted data and databases. The asset can include a special purpose processor.

The flow 200 includes weighting 220 the impact score. The weighting the impact score can include multiplying the impact score by a weighting value. The weighting can include scaling, normalizing, compressing, expanding, or otherwise adjusting the impact score. In embodiments, weighting the impact score can be based on an evaluation of the device for which the first cybersecurity threat notification was received. The device type such as fixed or portable, device configuration, device location, and so on, can include the weighting of the impact score. In other embodiments, the weighting the impact score can be based on an evaluation of a user of the device for which the first cybersecurity threat notification was received. The evaluation of the user can include a user position or role, the type of IT infrastructure and data to which the user has access, and the like. The evaluation of the user can include determining whether the user is a low, medium, high, or critical risk individual. In other embodiments, the weighting the impact score can be based on an evaluation of an owner of the device for which the first cybersecurity threat notification was received. The owner can include an individual using a personal electronic device, an individual using an organization-issued device, etc. In further embodiments, the weighting the impact score can be based on an evaluation of an asset for which the first cybersecurity threat notification was received. The asset can include a restricted access processor, a confidential database, a secure database, and the like. The asset can include networking infrastructure which enables access to sensitive processors and data, access to devices and data outside an organization, etc.

Various embodiments of the flow 200 can be included in a computer program product embodied in a non-transitory computer readable medium that includes code executable by one or more processors.

Figure 3:
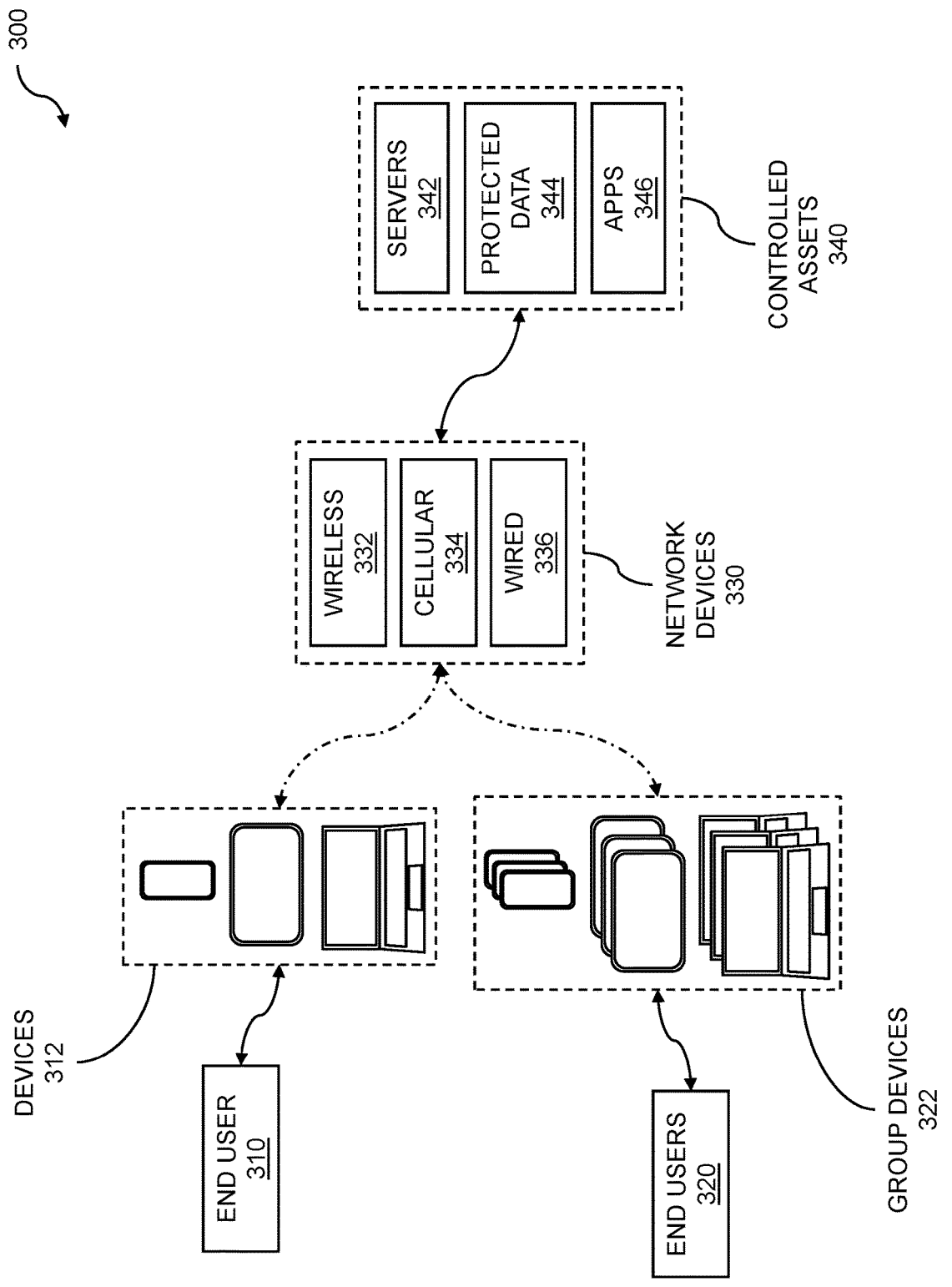
FIG. 3 is a system block diagram for devices and groups.

FIG. 3 is a system block diagram for devices and groups. Cybersecurity threats pose extreme risks to data networks associated with individual users, business enterprises, universities, hospitals, government agencies, and so on. Management of a cybersecurity threat can include identifying that a threat exists, determining the type of threat, blocking or removing the threat, and so on. Threat management can be applied to individual devices, groups of devices, networks, IT assets, and so on. Cybersecurity threat management of devices and groups uses impact scoring. A plurality of cybersecurity threat protection applications is accessed. A first cybersecurity threat notification is received from one of the plurality of cybersecurity threat protection applications. An impact score is dynamically assigned to the first cybersecurity threat notification, wherein the assigning an impact score is based on information about a device for which the first cybersecurity threat notification was received. The first cybersecurity threat notification is responded to, based on the impact score.

A system block diagram for an individual user, groups of users, and devices is shown 300. A user 310 can access one or more devices 312. The user can include an employee, a contractor, a faculty member, a student, a physician, a nurse, a manager, a salesperson, and so on. The user can have access the one or more devices for purposes associated with interacting with an enterprise, university, hospital, retail establishment, and the like. The devices can include personal electronic devices, electronic devices issued by an employer, etc. The devices can include a handheld device such as a smartphone, tablet, PDA, and the like. The devices can include a laptop, a lightweight device such as a Chromebook™ or similar device, and so on. A group of users 320 can access a plurality of devices 322. The users can also include employees, university or hospital affiliates, etc. The users can access a plurality of devices for purposes associated with interacting with an enterprise, etc. The devices can include personal electronic devices, electronic devices issued by an employer, etc. The devices can include handheld devices, a laptop, a lightweight device, etc.

In the system block diagram 300, communication to and from individual devices, groups of devices, and so on is accomplished using one or more network devices 330. The network devices can support data transfer, network resource access, and the like. Various types of network devices can be used. In embodiments, the network devices can support wireless 332 networking. The wireless network can be based on standard computer communication protocols such as 802.11 Wi-Fi, Bluetooth, etc. In other embodiments, the network devices can support cellular 334 communication. The cellular communication can be based on standard protocols such as CDMA and GSM standards. The cellular communication can include 4G, 5G, and so on. In other embodiments, the network devices can support wired 336 communication. The wired network communication can be based on standards such as Ethernet™.

The individual users and groups of users can use their devices to communicate with controlled assets 340. Access to controlled assets can require authentication such as a username and password, two-factor authentication, a cryptographic key, and so on. In the block diagram 300, the controlled assets can include servers 342. The servers can include processors, CPUs, GPUs, processor cores, and so on. The servers can include parallel processors. The servers can include customized servers for specialized applications. The controlled assets can include protected data 344. The protected data can include secured data, confidential data, classified data, and the like. Access to the protected data can be based on authentication, on a job type, on an employee rank, etc. The controlled assets can include applications 346. The applications can include specialized applications for data analysis; proprietary code for design, analysis, and processing; etc. Access to the applications can also include authentication, access controlled by an access control list (ACL), and the like.

Figure 4:
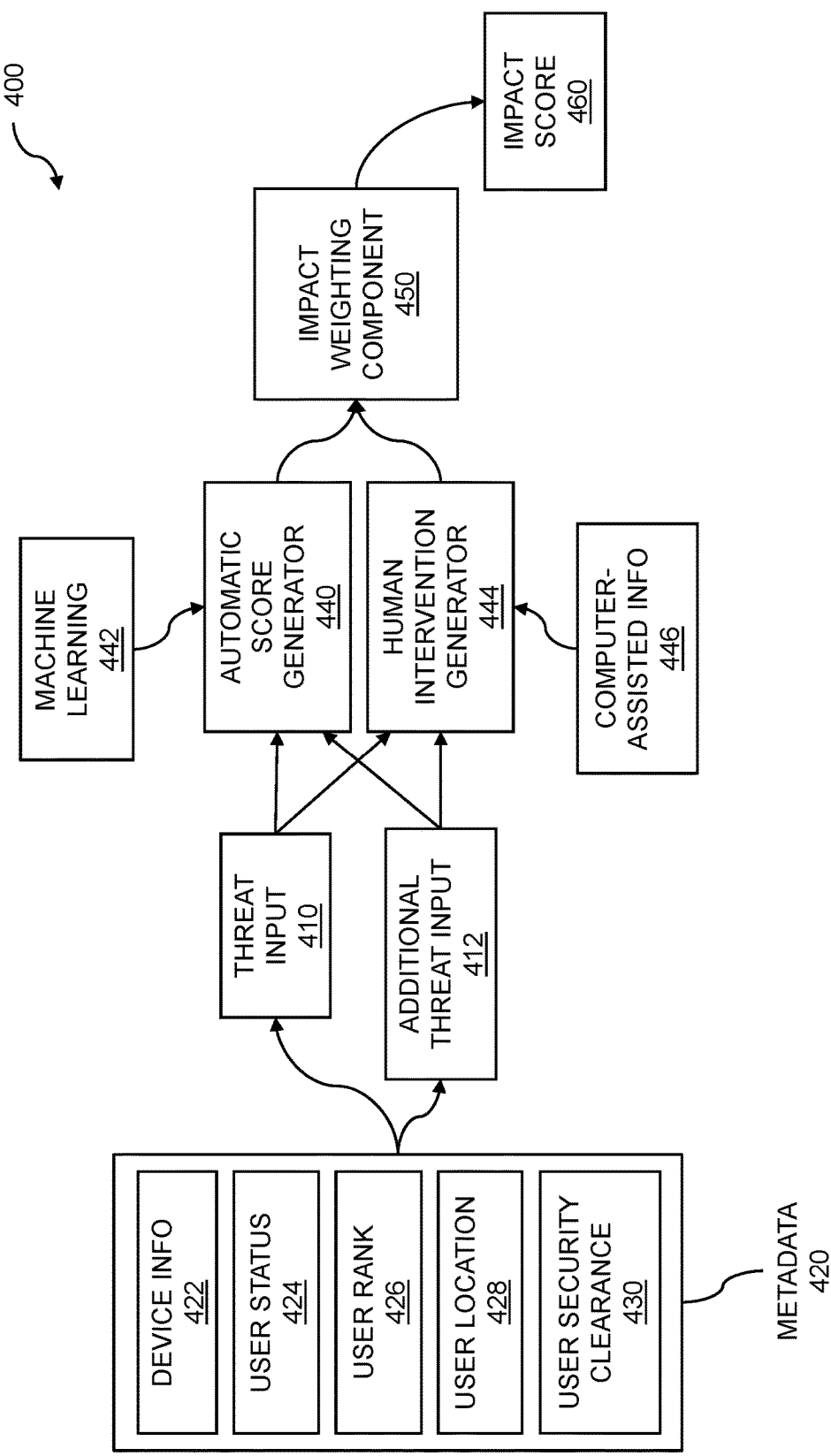
FIG. 4 is a system block diagram for impact scoring.

FIG. 4 is a system block diagram for impact scoring. Discussed throughout, an impact score can be dynamically assigned to a cybersecurity threat notification. The impact can be weighted based on evaluation of devices, users, assets, and so on. Information used for the evaluating can include impact score metadata. Impact score metadata enables cybersecurity threat management. A plurality of cybersecurity threat protection applications is accessed. A first cybersecurity threat notification is received from one of the plurality of cybersecurity threat protection applications. An impact score is dynamically assigned to the first cybersecurity threat notification, wherein the assigning an impact score is based on information about a device for which the first cybersecurity threat notification was received. The first cybersecurity threat notification is responded to, based on the impact score.

The system block diagram 400 includes a threat input 410. A threat input can include a cybersecurity threat notification, where the notification can be provided by one of a plurality of cybersecurity threat protection applications. The threat notification can be provided by threat protection applications that can detect port scans, hacking attempts, unauthorized access attempts, phishing attacks, distributed denial of service (DDoS) attacks, cryptojacking, and so on. A threat notification can be associated with device information, user information, and so on. In embodiments, the information about a device and information about one or more users of the device can include metadata. The metadata can include device details, user identification, user location, security information, and the like. More than one cybersecurity threat notification can be received. The block diagram 400 includes an additional threat input 412. The additional threat input can include one or more additional cybersecurity threat notifications. The additional notifications can be received from the same threat protection application, one or more additional threat protections applications, and so on. In embodiments, the additional cybersecurity threat notification can include information regarding the device for which the first cybersecurity threat notification was received. The device can include a server, a data server, a networking device, a desktop or laptop computer, a tablet, a smartphone, a PDA, and so on. In other embodiments, the additional cybersecurity threat notification can include information regarding a device that is distinct from the device for which the first cybersecurity threat notification was received. The distinct device notification can indicate that the threat is more widespread than merely involving a single device.

The system block diagram 400 can include metadata 420. Metadata, which includes "data about data", can be used to provide additional information about the one or more cybersecurity threats. In embodiments, the additional cybersecurity threat notification can include impact score metadata. The impact score metadata can include device information 422. The device information can include a type of device, device hardware configuration, device software image, and so on. The impact score metadata can include user status 424. The user status can include employee, contractor, faculty, student, hospital staff, etc. The impact score metadata can include user rank 426. User rank can be based on employment level, job description, department, and so on. User rank can include employee, contractor, faculty, student, medical staff, support staff, etc. The impact score metadata can include user location 428. User location can include onsite, remote, main campus, satellite campus, etc. The user location can include a building name or number, floor, room number, etc. The impact score metadata can include user security clearance 430. A user security clearance can be based on a military clearance level, a commercial clearance level, and the like.

The block diagram 400 can include an automatic score generator 440. The automatic score generator can dynamically assign an impact score to the first cybersecurity threat notification, one or more additional cybersecurity threats, and so on. In block diagram 400, the automatic generation can be based on machine learning (ML) 442. A machine component (not shown) can be based on a neural network (NN), a deep learning (DL) network, and so on. The machine learning component can be trained using training data for which known results such as impact scores have been identified. The block diagram can further include a human intervention "generator" 444. A human, such as a cybersecurity threat analyst, IT expert, and so on, can look at the one or more threat notifications and metadata to assess an impact. In the block diagram 400, the human intervention can be performed with computer-assisted information 446. The computer-assisted information can include forensic information, simulation or emulation data, additional information available from a website, and the like.

The system block diagram 400 includes an impact weighting component 450. The impact weighting component can perform a weighting operation on one or more dynamically assigned impact scores, where the impact scores can be assigned to one or more cybersecurity threat notifications. The weighting can include scaling, normalizing, mapping, offsetting, and the like. The impact score can be based on one or more cybersecurity threats, a combination of cybersecurity threats, and so on. The impact score weighting component can include one or more of processors, CPUs, GPUs, processor cores, etc. Embodiments can include weighting the impact score based on an evaluation of the device for which the first cybersecurity threat notification was received. The device can include a processor, a data storage device, a networking device, and so on. The weighting can include a priority rating such as low, medium, high, and critical. Other embodiments can include weighting the impact score based on an evaluation of a user of the device for which the first cybersecurity threat notification was received. The user can include a member of administrative staff, technical staff, financial staff, and so on. The weighting can be based access to sensitive assets based on position such as a C-level position. Further embodiments can include weighting the impact score based on an evaluation of an owner of the device for which the first cybersecurity threat notification was received. The owner of the device can include an enterprise such as a business, retailer, university, or hospital. The owner can include an individual using a user-owned device. Other embodiments can include weighting the impact score based on an evaluation of an asset for which the first cybersecurity threat notification was received. The asset can include a publicly available asset such as an external website, a low level asset such as a printer, a higher level asset such as office management software, critical data such as secure database information, etc. The system output of the impact weighting component can include an impact score 460. The impact score can include the dynamically assigned impact score, where the dynamically assigned impact score can be generated automatically, through human intervention, and so on. The impact score can further include an adjusted, combined, updated, or scaled impact score. In embodiments, the impact score includes the results of the impact weighting.

Figure 5:
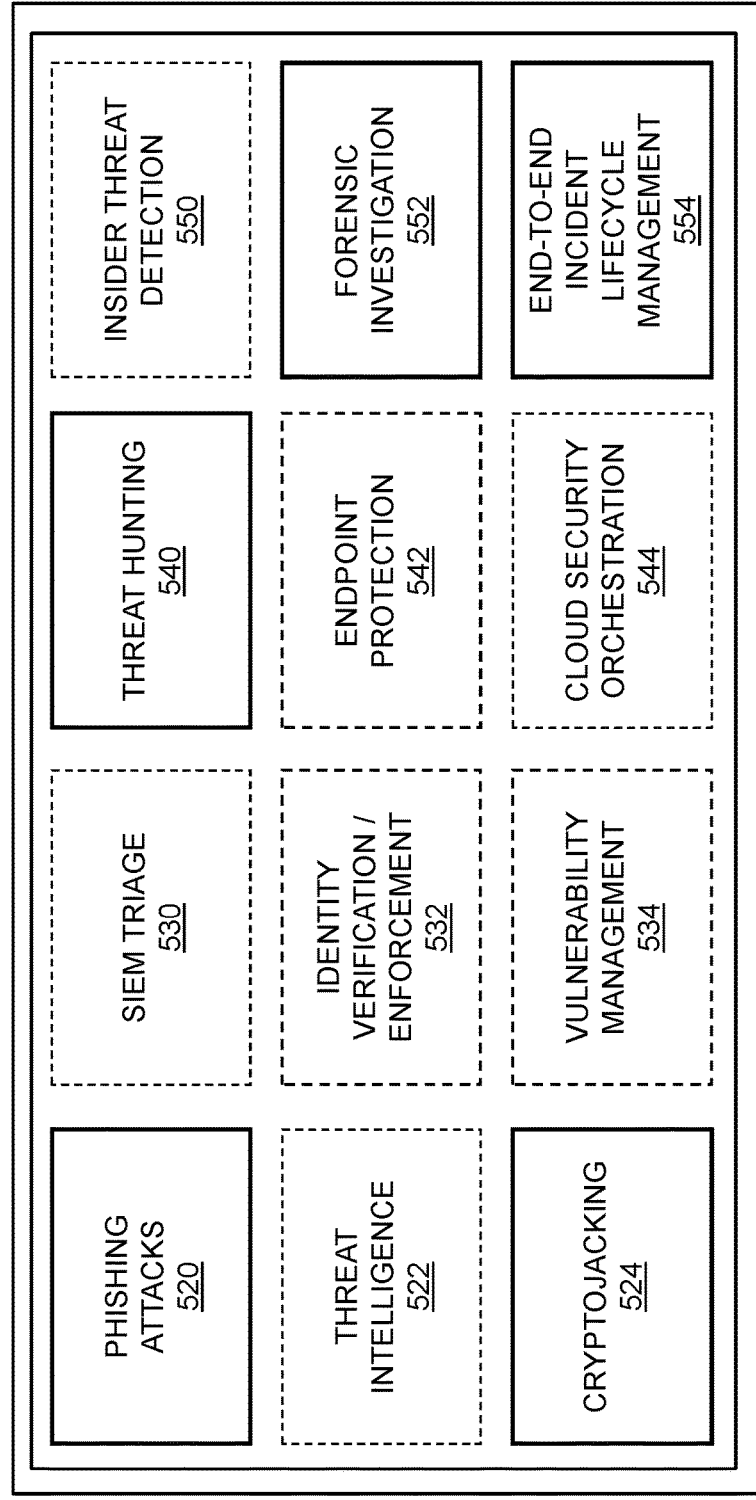
FIG. 5 shows an example user interface for cybersecurity threat management.

FIG. 5 shows an example user interface for cybersecurity threat management. Cybersecurity comprises management of a variety of threats to data, networks, devices, systems, and so on. The threats can include threats targeted at specific computers, network infrastructures, databases, and other organizational assets. The threats are directed at corporations, governments, hospitals, financial institutions, and the like. Cybersecurity threat management can include a variety of objectives such as determining a type of threat, containing the threat, neutralizing the threat, etc. An interface associated with the cybersecurity threat management can be rendered on a display. The user interface can be accessed by a user such as a systems administrator, a security administrator, an IT manager, and so on. The interface can present one or more detected cybersecurity threats to the user; offer the user options for addressing the one or more threats; present tools for detecting, stopping, and remediating threats; etc. A user can choose one or more of threats, proposed threat management techniques, etc., as she or he reacts to threats to their information technology (IT) infrastructure. An interface enables cybersecurity threat management using impact scoring. A plurality of cybersecurity threat protection applications is accessed. A first cybersecurity threat notification is received from one of the plurality of cybersecurity threat protection applications. An impact score is dynamically assigned to the first cybersecurity threat notification, wherein the assigning an impact score is based on information about a device for which the first cybersecurity threat notification was received. The first cybersecurity threat notification is responded to, based on the impact score.

A user interface for cybersecurity threat management is shown 500. The user interface associated with cybersecurity threat management can be rendered on a display 510. The display can include a display associated with a server, a desktop or laptop computer, a tablet device, a smartphone, a special purpose device for cybersecurity, and so on. Notification of one or more cybersecurity threats can be received and rendered on the display associated with a device accessible to a user. The one or more threat notifications can be rendered on the display, highlighted from among one or more possible cyber-threats, rendered along with proposed remediation plans and workflows, etc. By selecting a rendered cybersecurity threat on the screen, the user can be presented with details about the type of threat, the specific threat, devices attacked or compromised, assets targeted, and so on. In the example, twelve cybersecurity threat classes, protection plans, analysis and forensic tools, and so on are shown. More or fewer objects can be presented on the display to the user, where the presenting can be based on the cybersecurity threat management needs of an organization, an access level of the user, and the like. In a usage example, the access level of the user can include a low level, where the low level enables a user to execute cybersecurity threat management tasks. The level can include a medium level, where a user can select one or more management workflows from a plurality of workflows. The level can include a high level, where a user can create, edit, and delete workflows; direct the application of workflows; perform simulations and emulations of the workflows; etc. The level can include a critical level, where a user can create, edit, and delete workflows, direct the application of workflows, perform simulations and emulations of the workflows, etc. A critical level can often include immediate application of a remediation workflow. In embodiments, the cybersecurity threat management objects that can be selected can include phishing attacks 520, threat intelligence 522, cryptojacking 524 (e.g., stealing cryptocurrency), security information and event management (SIEM) triage 530, identity verification and enforcement 532, vulnerability management 534, threat hunting 540, endpoint protection 542, cloud security orchestration 544, insider threat detection 550, forensic investigation 552, end-to-end incident lifecycle management 554, etc. The user can obtain details associated with cybersecurity threat notifications by clicking on one or more of them, selecting the notifications from a menu, and so on. In the example 500, a user can select from cybersecurity threat notifications that indicate phishing attacks 520, cryptojacking 524, threat hunting 540, forensic investigation 552, and end-to-end incident lifecycle management 554. The user can then be presented with details about the notifications 520 and 524, tools to search, or hunt, for threats 540, and forensic analysis of a cyberattack 552. The user can further document the attack and steps taken to counter the attack 554.

Figure 6:
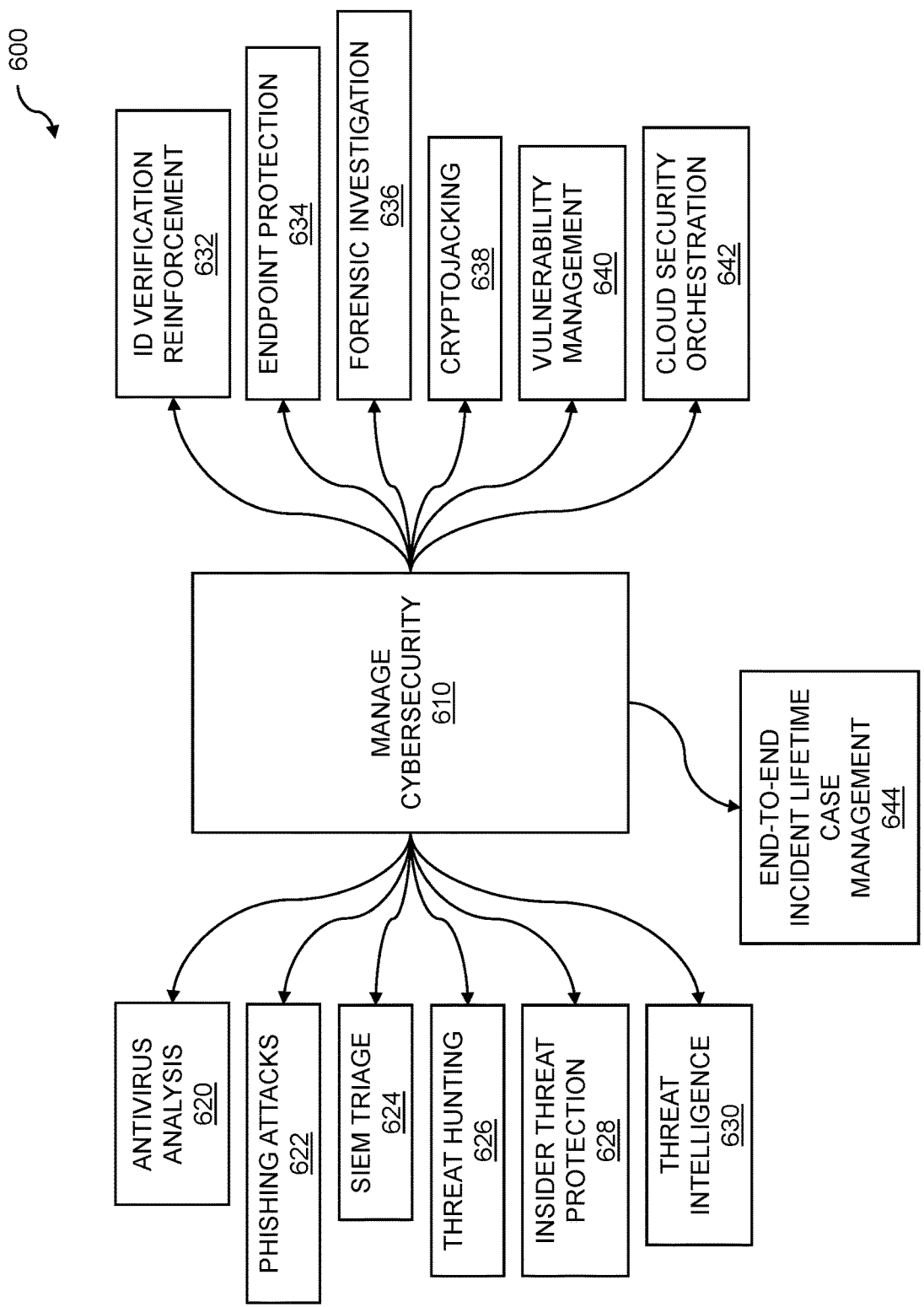
FIG. 6 is a flow diagram for cybersecurity management.

FIG. 6 is a flow diagram for cybersecurity management. Information technology (IT) infrastructure comprises computing devices, storage devices, networks, perhaps personal devices, and so on. Whether these IT elements are operated by an individual for personal use or by an organization in support of operations, all of the IT elements are targets of attacks from outside an organization. At times, the attacks can even originate from within an organization. Cybersecurity threat management includes accessing a variety of threat protection applications. The applications can detect an attack, determine the type of attack, determine the origin of an attack, and so on. Further, cybersecurity management provides techniques for addressing issues resulting from the attacks by countering the attacks and rectifying issues caused by the attacks. The various threat protection applications provide elements for detecting, neutralizing, countering, and rectifying cybersecurity threats. The elements associated with the applications can address substantially similar cybersecurity needs. Cybersecurity threat management is accomplished using impact scoring. A plurality of cybersecurity threat protection applications is accessed. A first cybersecurity threat notification is received from one of the plurality of cybersecurity threat protection applications. An impact score is dynamically assigned to the first cybersecurity threat notification, wherein the assigning an impact score is based on information about a device for which the first cybersecurity threat notification was received. The first cybersecurity threat notification is responded to, based on the impact score.

The flow 600 includes cybersecurity management 610. Cybersecurity management can include prioritizing a variety of IT techniques for identifying threat risks, correcting identified risks, counteracting active threats, and so on. Cybersecurity management can be based on accessing a range of applications (discussed below) which can include antivirus software, access control, data encryption, network channel encryption, and the like. In embodiments, cybersecurity includes managing the plurality of threat protection applications for a data network. The techniques that can be used for cybersecurity management can be based on one or more workflows. The workflows, which can include cybersecurity tasks and commands, can automate various tasks associated with cybersecurity management. In embodiments, the managing cybersecurity can include graphical control of the plurality of cybersecurity threat protection applications. The graphical control can enable dragging and dropping of tasks, commands, and so on, into a workflow. In other embodiments, the automation workflows can support dynamic swapping of cybersecurity threat protection applications. The workflows can support swapping-in or swapping-out one or more threat protection applications. The swapping-in and the swapping-out are enabled by a universal data layer (UDL). The UDL enables applications to be swapped without having to edit a workflow or create a new workflow to address the swapped-in application.

The flow 600 includes antivirus analysis 620. Antivirus analysis can include virus detection, Trojan horse program detection, and so on. The analysis can include determining a source or vector of a virus, the actions taken by the virus, how to counter actions taken by the virus, to whom the virus might be in communication, etc. The antivirus analysis can be used to determine changes or updates to the virus, and how to better detect the virus before it can be deployed. The flow 600 can include analysis of phishing attacks 622. Phishing is a form of attack that attempts to fraudulently obtain personal, sensitive, or private data and information. The data or information that is sought by phishing attacks can include personal information such as name, address, date of birth, telephone numbers, email addresses, and so on. The information can further include government-related information such as social security numbers, tax records, military service information, etc. The information can also include usernames and passwords to sensitive websites such as banks, brokerages, hospitals and health care providers, and the like. A phishing attack can purport to be from an entity known to a user by presenting the user with a legitimate looking webpage. However, links on the fraudulent page do not take the user to the legitimate site, but rather to a site designed to steal the victim's data.

The flow 600 includes security information and management (SIEM) triage 624. SIEM, which combines the management of security information and security events, can provide analysis of security alerts, alarms, warnings, etc., in real time. The alerts that are analyzed can be generated by one or more of the plurality of cybersecurity threat protection applications, by network security hardware, and so on. The triage can be used to determine the severity of an alert, the scale or extent of the alert, the urgency of the alert, and the like. The flow 600 includes threat hunting 626. Threat hunting can include techniques used to locate cybersecurity threats within a network, where the threats can elude detection using more common threat detection techniques. Threat hunting can include iteratively searching network-connected devices throughout a data network. Threat hunting can be used in addition to common cybersecurity techniques including firewalls for port blocking, intrusion detection, etc. The flow 600 includes insider threat protection 628. Insider threats are among the most difficult threats to counter because they are perpetrated by people who have knowledge of the security techniques implemented by an organization. An insider threat attack can include physical damage to computing, data, and network systems; data breaches; and the like. Insider threats can result from overly permissive access to sensitive areas or data, lax firewall policies, etc. An insider attack can include moving sensitive data to another device within the organization—a lateral transfer.

The flow 600 includes threat intelligence 630. Threat intelligence can include information associated with cybersecurity threats, used by an organization. The threat intelligence information can be associated with past security threats, current security threats, and threats likely to arise in the future. The information can be used by the organization to identify cybersecurity threats, to prevent the threats, and to prepare for inevitable threats that are likely to emerge in the future. The flow 600 includes identity verification reinforcement 632. Identity verification can include techniques to verify that a person who has access to computing systems, data systems, networks, and so on that are associated with an enterprise, is in fact a real person. Identity verification can be based on physical documents such as a government issued identification documents. The flow 600 can include endpoint protection 634. In a typical enterprise computing environment, individuals may try to use personal electronic devices to access the enterprise network. Such devices can include laptop computers, tablets, PDAs, smartphones, and the like. Such devices can pose a serious threat to an enterprise network because of operating systems which may not be updated, questionable applications which may be installed on the devices, etc. Endpoint protection can require that any device including personal electronic devices must meet certain standards prior to connection to the enterprise network. The standards can include approved devices, operating systems, applications, antivirus applications, virtual private network apps, etc.

The flow 600 includes forensic investigation 636. Digital forensic investigation can include data recovery, data maintenance, and investigation of data and information that can be found on various digital devices. Digital forensic techniques can be applied for investigation of a variety of digital malfeasances including cybercrime. Forensic investigation techniques can be used to determine, track, and locate perpetrators of cybercrime. The flow 600 includes the detection of cryptojacking 638. Cryptojacking can include hijacking of computers, servers, personal electronic devices and so on, for the purposes of mining cryptocurrency. The flow 600 includes vulnerability management 640. Vulnerability management seeks to reduce risks to computing systems, data systems, networks, and so on by identifying, evaluating, correcting, and communicating vulnerabilities associated with the computing systems and the applications that are executed on the computing systems. The flow 600 includes cloud security orchestration 642. Many individuals, and organizations such as businesses, hospitals, universities, and government agencies, use cloud services for processing, data storage, and other IT services. Cloud orchestration can manage relationships, interactions, and communications among computational workloads. The computational workloads can be associated with public cloud infrastructure and private cloud infrastructure. Cloud security orchestration can include imposing permissions and access oversight, and policy enforcement. The flow 600 includes end-to-end incident lifetime case management 644. An incident can include a virus outbreak, a distributed denial of service (DDOS) attack, and the like. Incident lifetime management can include identifying that an incident has occurred, notifying that the incident has occurred and escalating response to the incident, investigating and diagnosing the incident, and resolving the incident and recovering from the incident. Incident lifetime management can further include closing the incident, as well as other management actions.

Various embodiments of the flow 600 can be included in a computer program product embodied in a non-transitory computer readable medium that includes code executable by one or more processors.

Figure 7:
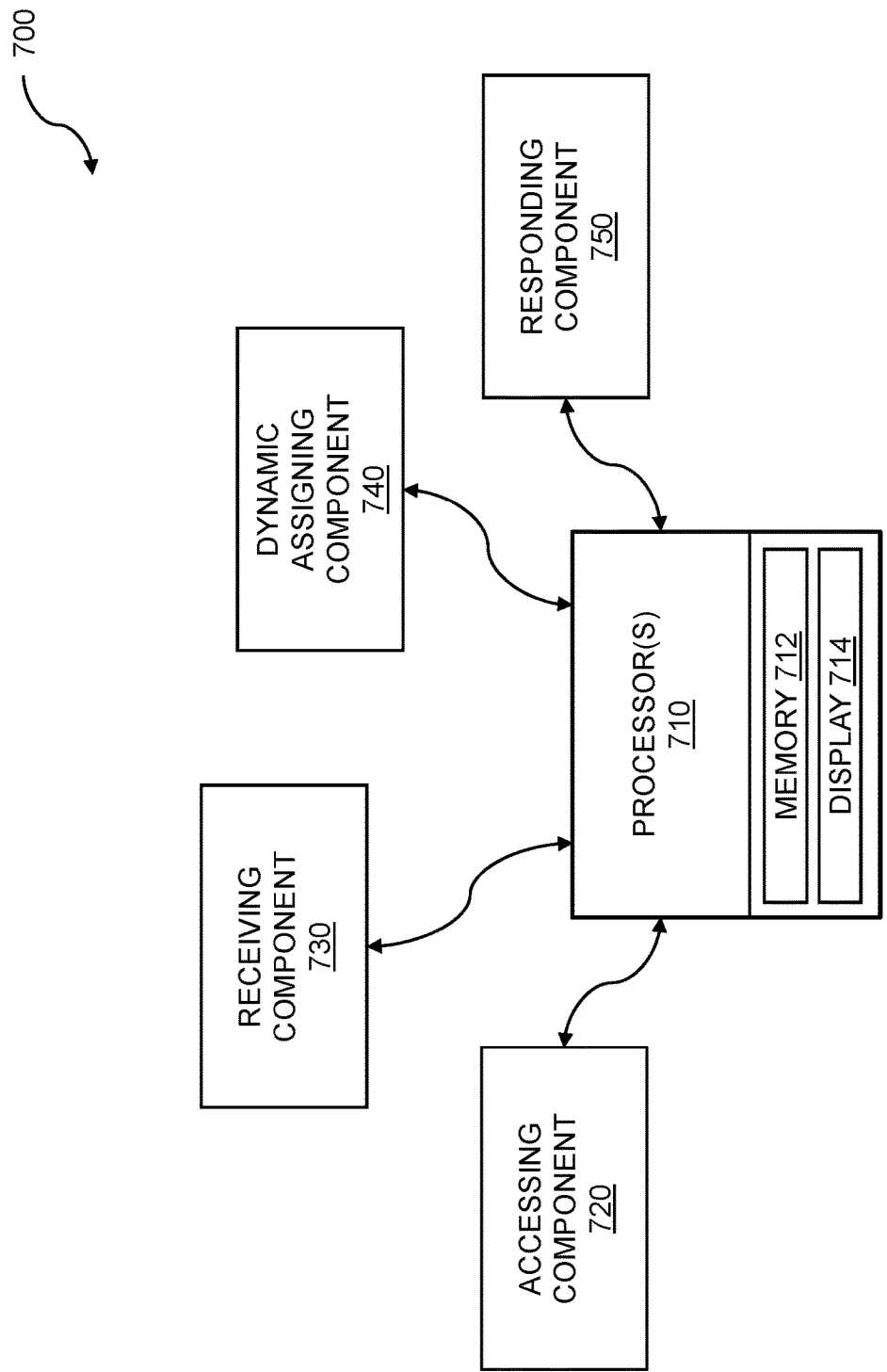
FIG. 7 is a system diagram for cybersecurity threat management using impact scoring.

FIG. 7 is a system diagram for cybersecurity threat management using impact scoring. The detection of and response to cybersecurity threats are mission critical to organizations that seek to secure their computing operations and infrastructure. The computing operations include data transfers, data manipulations, data storage, and so on, while the infrastructure includes servers, desktop computers, portable devices, etc. Common cybersecurity threats have been designed based on social engineering techniques such as phishing attacks, ransomware, distributed denial of service (DDoS) attacks, third-party software hacks, cloud computing and storage vulnerabilities, and the like. Impact scoring techniques can be used to detect a cybersecurity threat, to determine the extent and severity of the cybersecurity threat, and to remove, neutralize, or counter the threat as rapidly as possible. Impact scoring, which is based on evaluation of several factors, enables ranking of a cybersecurity threat. A response to the threat can be proposed and directed based on the impact score. A plurality of cybersecurity threat protection applications is accessed. A first cybersecurity threat notification is received from one of the plurality of cybersecurity threat protection applications. An impact score is dynamically assigned to the first cybersecurity threat notification, wherein the assigning an impact score is based on information about a device for which the first cybersecurity threat notification was received. The first cybersecurity threat notification is responded to, based on the impact score.

The system 700 can include one or more processors 710 and a memory 712 which stores instructions. The memory 712 is coupled to the one or more processors 710, wherein the one or more processors 710 can execute instructions stored in the memory 712. The memory 712 can be used for storing instructions, one or more cybersecurity applications, impact scores, information associated with one or more data networks, and the like. Information associated with cybersecurity threat management using impact scoring can be shown on a display 714 connected to the one or more processors 710. The display can comprise a television monitor, a projector, a computer monitor (including a laptop screen, a tablet screen, a netbook screen, and the like), a smartphone display, a mobile device, or another electronic display.

The system 700 can include an accessing component 720. The accessing component 720 can be used for accessing a plurality of cybersecurity threat protection applications. The applications can include applications for threat detection, assessment, and response management; web security; anti-virus; dark web monitoring; security ("white hat") testing; and so on. The plurality of cybersecurity threat protection applications can include at least two different data management schemas. A data management schema can include an organization or collection of management techniques associated with data. The management techniques can include data storage, access control to data (e.g., access control list or ACL, role-based access), and so on. The system 700 includes a receiving component 730. The receiving component 730 is configured to receive a first cybersecurity threat notification from one of the plurality of cybersecurity threat protection applications. The cybersecurity threat protection applications can indicate an alert by providing an output, where the output can include a signal, a flag, an SMS message, an email message, a proposed action, a recommended technique, and so on. The outputs that are received from one or more cybersecurity applications can be based on substantially similar detection actions or can apply substantially similar detection techniques.

The system 700 can include a dynamic assigning component 740. The dynamic assigning component 740 can dynamically assign an impact score to the first cybersecurity threat notification, wherein the assigning an impact score is based on information about a device for which the first cybersecurity threat notification was received. The information about the device can include a type of device such as a handheld device, a portable device, a personal device, a device provided by an organization, etc. The information can further include information about the user of the device. The user information can include identifying information associated with the user; a user role, status, and rank within an organization; user privileges such as access and security privileges; user location; and the like. In embodiments, the information about a device and information about one or more users of the device can include impact score metadata. The impact score metadata can be used to gauge the severity of a threat, to set a priority for a threat, etc. In embodiments, the dynamically assigning can include the impact score metadata. The impact score can be adjusted, scaled, normalized, etc. Embodiments can include weighting the impact score based on an evaluation of the device for which the first cybersecurity threat notification was received. The weighting can be based on a numerical value, a percentage, a scale, a priority, a precedence, etc. The weighting can further be based on an evaluation of the device, the user, the device owner, and an asset. A variety of techniques can be used to generate an impact score. In embodiments, the impact score can be generated automatically. The automatic generation can be based on a table lookup, an algorithm, a heuristic, a process, and the like. In embodiments, the automatic generation can be based on machine learning. In another technique, the impact score can be generated by human intervention. A systems administrator, a security administrator, an operations manager, etc., can examine the cybersecurity threat and determine of how to handle the threat. In embodiments, the human intervention can be performed with computer-assisted information. The computer-assisted information can include computer analysis, recommended courses of action, etc.

The system 700 can include a responding component 750. The responding component 750 can respond to the first cybersecurity threat notification, based on the impact score. The responding to a cybersecurity threat notification can include managing individual devices coupled to a data network, groups of devices, regions of a data network, and so on. The responding can include granting user access to an asset, denying access, isolating one or more devices, notifying security or law enforcement, and the like. The responding can include one or more tasks, procedures, protocols, workflows, techniques, etc., associated with cybersecurity. In embodiments, the responding to a cybersecurity threat can include managing one or more of anti-virus analysis, phishing attacks, review, security information and event management (SIEM) triage, threat hunting, insider threat protection, threat intelligence, identity verification reinforcement, endpoint protection, forensic investigation, cryptojacking, vulnerability, cloud security orchestration, and end-to-end incident lifecycle cases. The responding can include "white hat" testing such as penetration testing of one or more of networks, systems, devices, and so on. The white hat penetration testing can include white box testing, where a tester can have full access and knowledge of networks, systems, and so on. The white hat testing can further include black box testing (no access or knowledge), gray box testing (some access and knowledge), etc.

The responding can include simulating or emulating cyber security threats. Embodiments further include simulating cybersecurity threat scenarios by activating inputs of the first mapping independently of the plurality of cybersecurity threat protection applications. The simulation can be based on virtual activation, actual activation, and so on. In embodiments, the simulating virtually activates cybersecurity measures in a simulation mode. One or more devices coupled to a data network can be taken offline, placed in a "security playpen", etc. In other embodiments, the simulating actually activates cybersecurity measures in the data network. The actually activating cybersecurity measures in the data network can be accomplished using a variety of techniques such as activating outputs of the second mapping. Further embodiments include activating one or more data enrichment protocols for a threat, based on the data stimuli received from at least one of the plurality of cybersecurity threat protection applications. The data enrichment can be accomplished by enabling additional features of a cybersecurity threat application, activating additional applications, etc. In embodiments, the one or more data enrichment protocols can include accessing a website. The website can include a secure website. In embodiments, the accessing a website can enable additional information gathering for the threat.

Disclosed embodiments include a computer program product embodied in a non-transitory computer readable medium for cybersecurity management, the computer program product comprising code which causes one or more processors to perform operations of: accessing a plurality of cybersecurity threat protection applications; receiving a first cybersecurity threat notification from one of the plurality of cybersecurity threat protection applications; dynamically assigning an impact score to the first cybersecurity threat notification, wherein the assigning an impact score is based on information about a device for which the first cybersecurity threat notification was received; and responding to the first cybersecurity threat notification, based on the impact score. Disclosed embodiments include a computer system for cybersecurity comprising: a memory which stores instructions; one or more processors coupled to the memory wherein the one or more processors, when executing the instructions which are stored, are configured to: access a plurality of cybersecurity threat protection applications; receive a first cybersecurity threat notification from one of the plurality of cybersecurity threat protection applications; dynamically assign an impact score to the first cybersecurity threat notification, wherein the assigning an impact score is based on information about a device for which the first cybersecurity threat notification was received; and respond to the first cybersecurity threat notification, based on the impact score.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited neither to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for cybersecurity management comprising:
   accessing a plurality of cybersecurity threat protection applications;
   detecting, based on applying an anti-cryptojacking application, a cryptojacking event of a first device, wherein the cryptojacking event corresponds to mining cryptocurrency using the first device;
   receiving a first cybersecurity threat notification from one of the plurality of cybersecurity threat protection applications based on the detected cryptojacking event;
   dynamically assigning an impact score to the first cybersecurity threat notification using a machine learning neural network, wherein the assigning an impact score is based on information about the first device for which the first cybersecurity threat notification was received, wherein the information about the first device for which the first cybersecurity threat notification was received comprises a security metric that comprises a mean-time-to-respond to the threat notification for the device;
   detecting, based on applying an insider threat protection application, an insider threat event of a second device, wherein the insider threat event corresponds to one or more users of the second device moving data from the first device to the second device;
   receiving an additional cybersecurity threat notification based on the detected insider threat event, wherein the additional cybersecurity threat notification includes a management level designation for at least one of the one or more users of the second device, wherein the second device is distinct from the first device for which the first cybersecurity threat notification was received;
   adjusting the impact score assigned to the first cybersecurity threat notification for the cryptojacking event of the first device based on the additional cybersecurity threat notification, wherein the adjusting comprises multiplying the impact score by a weighting value based on the management level designation for the at least one of the one more users of the second device received in the additional cybersecurity threat notification based on the detected insider threat event;
   determining whether the impact score satisfies a threshold value; and
   executing, based on a determination that the impact score satisfies the threshold value, a cryptojacking countermeasure to respond to the first cybersecurity threat notification.

2. The method of claim 1 wherein the information about the device and information about one or more users of the device comprise impact score metadata.

3. The method of claim 1 wherein the dynamically assigning includes impact score metadata.

4. The method of claim 1 further comprising weighting the impact score based on an evaluation of the device for which the first cybersecurity threat notification was received.

5. The method of claim 1 further comprising weighting the impact score based on an evaluation of a user of the device for which the first cybersecurity threat notification was received.

6. The method of claim 1 further comprising weighting the impact score based on an evaluation of an owner of the device for which the first cybersecurity threat notification was received.

7. The method of claim 1 further comprising weighting the impact score based on an evaluation of an asset for which the first cybersecurity threat notification was received.

8. The method of claim 1 wherein the impact score is generated automatically.

9. The method of claim 1 wherein the impact score is generated by human intervention.

10. The method of claim 9 wherein the human intervention is performed with computer-assisted information.

11. The method of claim 1 wherein the device comprises a group of devices.

12. The method of claim 11 wherein the group of devices comprises a network infrastructure.

13. The method of claim 11 wherein the group of devices comprises multiple end-user devices.

14. The method of claim 11 wherein the group of devices comprises a portable, network-connected device.

15. The method of claim 1 wherein the additional cybersecurity threat notification includes information regarding the device for which the first cybersecurity threat notification was received.

16. The method of claim 1 wherein the additional cybersecurity threat notification includes impact score metadata.

17. The method of claim 1 wherein the impact score informs one or more workflows controlling cybersecurity threat management.

18. The method of claim 1 wherein the information about a device for which the first cybersecurity threat notification was received includes a management level designation for the device or a user of the device.

19. The method of claim 1 wherein the information about a device for which the first cybersecurity threat notification was received includes a usage location designation.

20. The method of claim 1 wherein the information about a device for which the first cybersecurity threat notification was received includes a security clearance designation for the device or a user of the device.

21. A computer program product embodied in a non-transitory computer readable medium for cybersecurity management, the computer program product comprising code which causes one or more processors to perform operations of:
   accessing a plurality of cybersecurity threat protection applications;
   detecting, based on applying an anti-cryptojacking application, a cryptojacking event of a first device, wherein the cryptojacking event corresponds to mining cryptocurrency using the first device;
   receiving a first cybersecurity threat notification from one of the plurality of cybersecurity threat protection applications based on the detected cryptojacking event;
   dynamically assigning an impact score to the first cybersecurity threat notification using a machine learning neural network, wherein the assigning an impact score is based on information about the first device for which the first cybersecurity threat notification was received, wherein the information about the first device for which the first cybersecurity threat notification was received comprises a security metric that comprises a mean-time-to-respond to the threat notification for the first device;
   detecting, based on applying an insider threat protection application, an insider threat event of a second device, wherein the insider threat event corresponds to one or more users of the second device moving data from the first device to the second device;

receiving an additional cybersecurity threat notification based on the detected insider threat event, wherein the additional cybersecurity threat notification includes a management level designation for at least one of the one or more users of the second device, wherein the second device is distinct from the first device for which the first cybersecurity threat notification was received;

adjusting the impact score assigned to the first cybersecurity threat notification for the cryptojacking event of the first device based on the additional cybersecurity threat notification, wherein the adjusting comprises multiplying the impact score by a weighting value based on the management level designation for the at least one of the one more users of the second device received in the additional cybersecurity threat notification based on the detected insider threat event;

determining whether the impact score satisfies a threshold value; and executing, based on a determination that the impact score satisfies the threshold value, a cryptojacking countermeasure to respond to the first cybersecurity threat notification.

22. The computer program product of claim 21, wherein the computer program product comprises code which causes the one or more processors to perform further operations of:

weighting the impact score based on an evaluation of the device for which the first cybersecurity threat notification was received.

23. A computer system for cybersecurity comprising:
a memory which stores instructions;
one or more processors coupled to the memory wherein the one or more processors, when executing the instructions which are stored, are configured to:
  access a plurality of cybersecurity threat protection applications;
  detect, based on applying an anti-cryptojacking application, a cryptojacking event of a first device, wherein the cryptojacking event corresponds to mining cryptocurrency using the first device;
  receive a first cybersecurity threat notification from one of the plurality of cybersecurity threat protection applications based on the detected cryptojacking event;
  dynamically assign an impact score to the first cybersecurity threat notification using a machine learning neural network, wherein the assigning an impact score is based on information about the first device for which the first cybersecurity threat notification was received, wherein the information about the first device for which the first cybersecurity threat notification was received comprises a security metric that comprises a mean-time-to-respond to the threat notification for the first device;
  detecting, based on applying an insider threat protection application, an insider threat event of a second device, wherein the insider threat event corresponds to one or more users of the second device moving data from the first device to the second device;
  receiving an additional cybersecurity threat notification based on the detected insider threat event, wherein the additional cybersecurity threat notification includes a management level designation for at least one of the one or more users of the second device, wherein the second device is distinct from the first device for which the first cybersecurity threat notification was received;
  adjusting the impact score assigned to the first cybersecurity threat notification for the cryptojacking event of the first device based on the additional cybersecurity threat notification, wherein the adjusting comprises multiplying the impact score by a weighting value based on the management level designation for the at least one of the one more users of the second device received in the additional cybersecurity threat notification based on the detected insider threat event;
  determine whether the impact score satisfies a threshold value; and
  execute, based on a determination that the impact score satisfies the threshold value, a cryptojacking countermeasure to respond to the first cybersecurity threat notification.

24. The computer system of claim 23, wherein the one or more processors, when executing the instructions which are stored, are further configured to:
weight the impact score based on an evaluation of the device for which the first cybersecurity threat notification was received.

* * * * *